Nov. 22, 1955    L. W. LEDGERWOOD, JR    2,724,574
HYDRAULIC STANDOFF CONTROL FOR PELLET IMPACT DRILLING
Filed Jan. 29, 1952    2 Sheets-Sheet 1
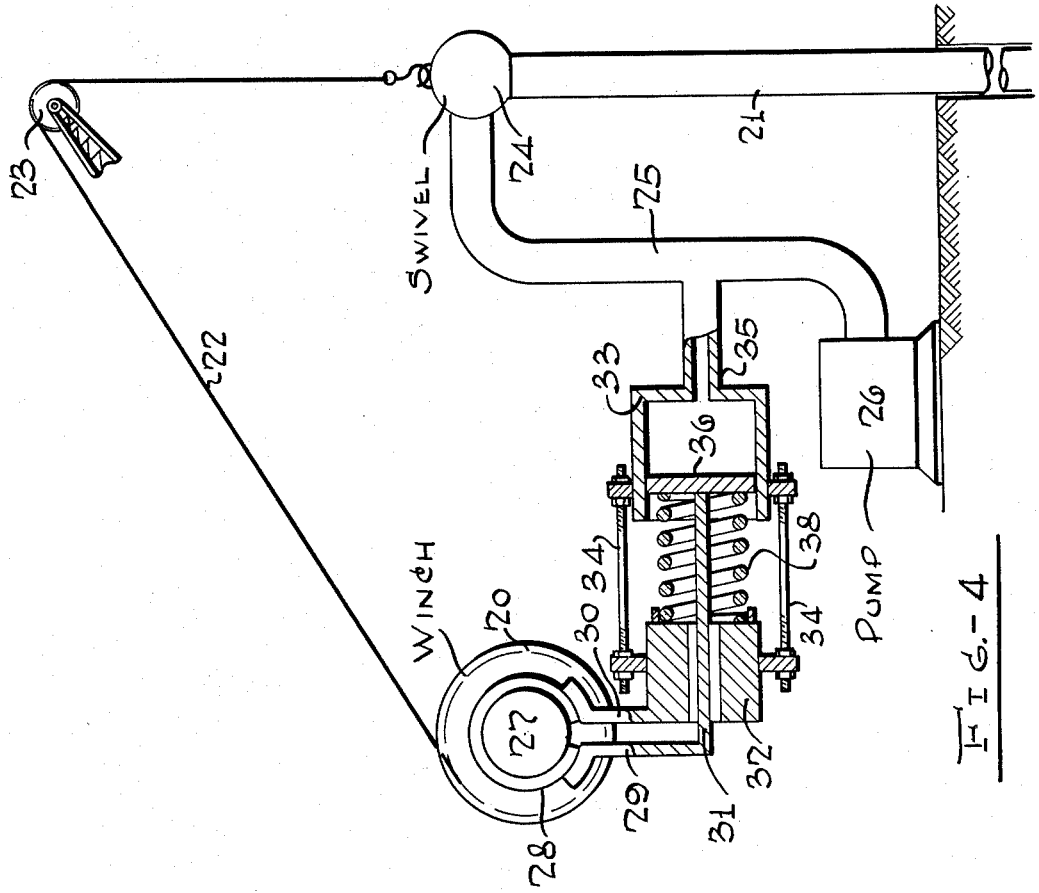
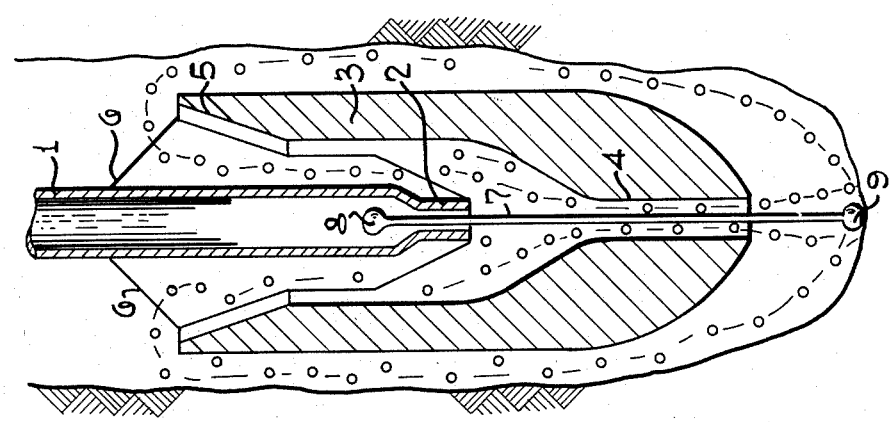
Leroy W. Ledgerwood Jr. Inventor
By W. O. T Heilman Attorney Nov. 22, 1955 L. W. LEDGERWOOD, JR 2,724,574
HYDRAULIC STANDOFF CONTROL FOR PELLET IMPACT DRILLING
Filed Jan. 29, 1952 2 Sheets-Sheet 2

Leroy W. Ledgerwood Jr. Inventor
By W. O. T Heikman Attorney

United States Patent Office
2,724,574
Patented Nov. 22, 1955

2,724,574

HYDRAULIC STANDOFF CONTROL FOR PELLET IMPACT DRILLING

Leroy W. Ledgerwood, Jr., Tulsa, Okla., assignor to Esso Research and Engineering Company, a corporation of Delaware Application January 29, 1952, Serial No. 268,883

8 Claims. (Cl. 255—61)

This invention concerns an improvement of what has been called pellet impact drilling. In pellet impact drilling a jetted stream of high velocity pellets is directed against an earth formation to be drilled. Impact of these pellets against the formation creates an effective drilling action. In this form of drilling it becomes important to space the nozzle employed for ejecting the pellets at an optimum distance from the bottom of the bore hole. The present invention concerns use of a mechanical feeler coupled to hydraulic valve arrangements to provide hydraulic information at the surface of the earth permitting precise control of the displacement of the nozzle from the bottom of the bore hole.

The basic principles of pellet impact drilling are fundamentally simple. Means are simply required to provide a jet of high velocity fluid including provision for entraining and accelerating pellets in this jet of fluid. The requisites of this drilling procedure concern the nature of the pellets employed, and the fluid employed therewith as a propelling and recirculation agent for the pellets.

The pellets to be employed must be of substantial size. Thus it has been found that granular pellets or pellets having a diameter less than about 1/8 of an inch are relatively ineffective in drilling. In general the rate of drilling attainable increases as the size of the pellets is increased. For this reason it is generally preferred to employ the largest pellets possible, consistent with the nozzle size of the apparatus and the fracturing characteristics of the pellets. As will be emphasized, the nature of the drilling fluid employed also has a bearing on the size of the pellets. However, it may be stated that when employing a gas, such as air, for the drilling fluid, pellets of about 1/8 to a quarter of an inch in diameter are to be employed. When using a liquid, such as water or drilling mud, as the drilling fluid, the pellets may range in size from about 1/4 to 1 inch. The preferred size range in this case is between 1/2 and 3/4 of an inch.

It is important that the pellets have the greatest practical density. It is apparent that the greater the density of a given sized pellet the greater the kinetic energy which can be attained and the greater the impact force which can be developed. Again, as will be brought out, the separation characteristics of the pellets from the drilling fluid employed play an important part in drilling efficiency. Since the separation rate of the pellets from a fluid depends in part upon the density of the pellets, it is apparent that this factor again dictates use of a high density pellet.

The configuration and surface characteristics of the pellets are also important. The pellets should be substantially spherical in nature and should have a smooth surface so as to limit wear of the jet nozzle assembly through which the pellets are to be ejected. In this connection it is fundamental that a spherical body possesses the best resistance to fracture due to impact; no other shape possesses the mechanical strength of a sphere. The factors of spherical configuration and smooth surface also relate to the separation characteristics of the pellets from the entraining fluid as will be noted below.

In view of these considerations the pellets to be employed are generally metal spheres having the desired properties of impact resistance, hardness, and toughness. Iron, steel and other ferrous alloys may be employed to prepare the pellets. In this connection, however, it should be observed that it is essential that the metal chosen be non-brittle in character. Due to their high density, tungsten carbide alloys of the less brittle character are attractive for use in the pellets to be employed. Again, alloys of this character or other dense metals may be employed as a pellet core material, surfaced by ferrous alloys having the requisite toughness.

As suggested heretofore, the separation characteristics of the pellets from the drilling fluid play an important part in the efficiency of pellet impact driling. It is apparent that in jetting a stream of fluid, entraining the pellets referred to, against a formation to be drilled, it becomes important that the pellets readily separate from this stream of fluid. This is required so that the pellets will not be cushioned by the fluid and will not be inefficiently swept from the drilling zone in the fluid flow stream. Again, regardless of the type of pellet recirculation employed, it becomes necessary in some manner to subsequently secure separation of pellets from an upward flow of drilling fluid in the bore hole for return and recirculation of the pellets to the drilling zone.

Consequently, as emphasized heretofore, pellets of the character defined must be employed to have the separation characteristics required for effective drilling. In this connection it is apparent that the nature of the drilling fluid employed also affects the separation characteristics of the pellets. From this viewpoint it is desirable to employ a drilling fluid having the lowest viscosity and lowest density practical, consistent with other requirements of the drilling fluid. It has been found in the drilling operations conducted that the drilling rate obtainable is proportional to the ratio of the density of the pellets to the density of the drilling fluid. This consideration makes the use of air or other gas attractive. Similarly, if a liquid is to be employed, water or other low density liquid is preferably employed. Nonetheless, if considered desirable, drilling muds of the character conventionally used in rotary drilling may be employed.

Recirculation of the pellets in the immediate vicinity of the drilling zone may be accomplished in a number of ways. When the pellets have been forced against a formation by jetted fluid, the fluid flow will carry the pellets outwardly and upwardly in an annular channel along the wall of the bore hole. At some point spaced above the bottom of the bore hole, it becomes necessary therefore to separate the entrained pellets from the upflowing drilling fluid. One method by which this may be accomplished is to provide a low velocity fluid zone above the drilling apparatus in which the pellets may settle by gravity into a recirculation system. Such a low volocity zone may be provided by narrowing the cross-sectional area of the apparatus immediately above the drill so as to provide an enlarged annular space in the bore hole. This gravity recirculation can be supplemented or replaced by a mechanical deflection system serving to maintain the pellets in captive recirculation. A shroud may be employed for this purpose of a character substantially blocking the bore hole but containing passages through which drilling fluid and pulverized earth formation may be carried to the surface of the earth.

It is generally desirable in obtaining a suitable ejection of pellets to employ a nozzle assembly utilizing a primary and secondary jet nozzle. The primary nozzle is employed to convert fluid pumping pressure to velocity energy. Consequently fluid pumped through the primary nozzle is subjected to a substantial pressure drop, of 100 pounds per square inch or more, to provide a constricted directed high velocity jet of fluid. An elongated secondary nozzle is positioned immediately below and concentric with the primary nozzle. The secondary nozzle should have a substantially greater diameter than the primary nozzle to accommodate the total volume of fluid from the primary nozzle in addition to the volume of pellets there entrained. The secondary nozzle must be elongated or tubular in nature to permit effective entrainment and acceleration of the pellets. This configuration and arrangement of nozzles, by its nature, creates an aspirating effect which plays a part in the recirculation of the pellets.

In the type of pellet impact drilling identified, it is apparent that the jet nozzle assembly employed should be positioned at an optimum and critical distance from the bottom of the bore hole in which drilling is conducted. Thus, if the jet nozzle assembly is too far from the bottom of the bore hole, the energy of the jet is dissipated in turbulence and little or no drilling is accomplished. If, however, the jet nozzle assembly is too close to the bottom of the borehole, the incidence of inefficient pellet-against-pellet impacts increases and too small a bore hole is cut.

In accordance with the present invention, means are disclosed and claimed for maintaining a desired displacement of the jet nozzle assembly from the bottom of a bore hole. The apparatus embodies a mechanical standoff arrangement of a character to develop hydraulic pressure differences in the drilling fluid circulation system, indicative of the displacement of the jet nozzle assembly from the bottom of the bore hole. Four of the principal variations of this invention are illustrated in the attached drawings. These drawings show cross-sectional elevational views of preferred embodiments of the invention in which:

Figure 1 illustrates the basic principle of this invention in the simplest operative form;

Figure 4 diagrammatically illustrates an embodiment of the invention adapted to automatically control lowering of the drill pipe to maintain optimum positioning of the jet nozzles in the bore hole.

Figure 2:
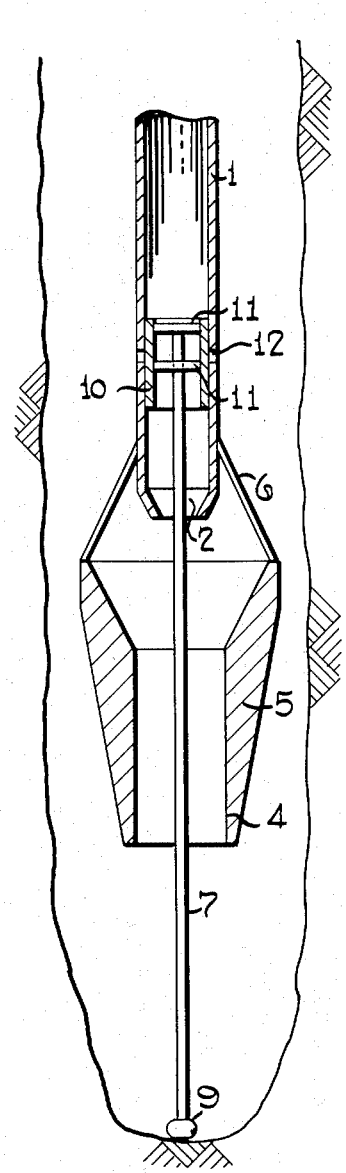
Figure 2 shows an alternative form of the invention in which a sliding sleeve is employed to expose hydraulic ports and thereby provide hydraulic indications when the jet nozzle assembly is too close to or too far from bottom of the bore hole.

Referring first to Figure 1, the basic form of a pellet impact drill is illustrated. The drill shown is supported in drilling position by means of a tubular support member 1 which may constitute or be attachable to the lower end of a conventional drill string. A primary nozzle 2 is fixed to the lower termination of the tubular support 1. A sleeve element 3 is provided below and around the primary nozzle 2 including a cutaway passage providing a secondary nozzle 4. The inner and upper surface of the passage provided in sleeve 3 may be flared outwardly as shown to provide a hopper 5 for recirculated pellets. Web plate elements 6 may be fixed to the support 1 and the sleeve element 3 to maintain the apparatus elements in the fixed position required.

In the operation of this drill, fluid is pumped through the tubular support 1 and ejected from the primary nozzle 2 as a high velocity jet of fluid. This fluid is directed downwardly toward the secondary nozzle 4 wherein the fluid jet entrains and accelerates the multitudinous pellets provided. These jetted pellets are propelled against the bottom of the bore hole and thereafter are forced outwardly and upwardly in the bore hole by the fluid circulation. Pellets entrained in this manner may be carried upwardly somewhat above the sleeve element 3. However above the sleeve 3 the enlarged annular space provides a low velocity fluid zone in which the pellets may separate from the drilling fluid to drop into the hopper provided and recirculate to the fluid jet in the manner described.

In accordance with this invention a mechanical feeler 7, as shown, may be positioned so as to extend through both the primary and secondary jet nozzle. The upper termination of the mechanical feeler is provided with an enlargement 8 of a character adapted to partially block the jet nozzle 2 if permitted to drop downwardly into the jet nozzle orifice. The lower termination of the feeler 7, which rests against the bottom of the bore hole, is blunt in nature and may, if desired, constitute a spherical enlargement 9.

The upper enlargement 8 of the feeler, while serving the function of a valve, should not completely seal nozzle 2 when in operative position; this would result in blowing of the safety valve ordinarily associated with the drilling fluid pumping system. Consequently, element 8 should be adapted to only partially block the passage through nozzle 2 so as to cause an appreciable increase in the pressure drop across the orifice without sealing it completely. For this purpose, element 8 may be polygonal in shape to leave free passage through the orifice when in sealing position. Again, if cylindrical in shape, fluted passages or a central passage may be cut through the element. As an example of another alternative configuration, element 8 may be smaller in diameter than nozzle 2, having a transverse pin passing through the top of the element to prevent it from dropping completely through the nozzle 2.

The length of the mechanical feeler 7 is sufficiently great so that when the jet nozzle is at the optimum distance from the bottom of the bore hole, the feeler will be in the position illustrated in Figure 1. In this position fluid may pass substantially unimpeded through the primary nozzle and the drill may operate in the manner formerly described. However, if the drilling rate exceeds the rate at which the tubular support 1 is lowered into the bore hole, valve element 8 of the mechanical feeler will drop downwardly so as to throttle passage of fluid through the primary nozzle. Consequently, the hydraulic pressure in the tubular member 1 will be increased to inform an operator at the surface of the earth that lowering of the tubular support 1 is required.

Dependent upon the hydraulic information provided in this manner, optimum spacing of the jet nozzle may consistently be maintained. Periodically an operator at the surface of the earth may stop progression of the drill string downwardly or may raise the drill string somewhat until an increase in hydraulic pressure is noted due to functioning of the mechanical standoff. This will provide precise information as to the distance of the jet assembly from the bottom of the bore hole and by lowering the drill string a fixed amount, the optimum jet positioning may be established and closely maintained.

Referring to Figure 2, a somewhat different embodiment of the invention is shown in which the mechanical feeler 7 is surmounted by a sleeve arrangement 10 in place of the enlargement 8 of Figure 1. The mechanical feeler 7 may be fixed to the sleeve 10 as by means of the web elements 11 illustrated. Adjacent the sleeve element 10, ports 12 are cut through the tubular support member 1. Consequently, movement of the mechanical feeler 7 above or below certain limits of movement will cause sleeve 10 to be moved so as to expose the ports 12. This arrangement therefore functions as a slide valve arrangement. When the ports are exposed by movement of sleeve 10, a drop in hydraulic pressure may be noted at the surface of the earth to inform an operator that repositioning of the jet nozzle with respect to the bottom of the bore hole is required.

Figure 3:
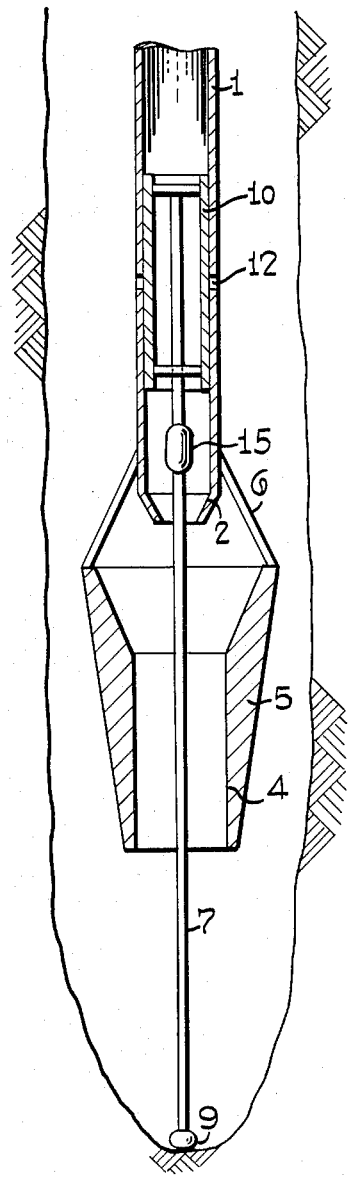
Figure 3 illustrates a form of the invention of a nature to develop different hydraulic indications when the jet nozzle assembly is too close and when it is too far from the bottom of the bore hole.

Referring now to Figure 3, a preferred form of the invention is illustrated providing sensing information when the jet nozzle is either too close or too far from the bottom of the bore hole. This embodiment of the invention essentially combines the features of the apparatus of Figures 1 and 2. Thus, again the mechanical feeler 7 is fixed to a sleeve element 10 in the manner described in conjunction with Figure 2. An enlargement 15 is also maintained on the mechanical feeler which is normally just above the primary nozzle 2. The enlargement 15 serves as a valve element of a nature to partially block nozzle 2 if permitted to seat in or enter the nozzle opening.

In the operation of the apparatus of Figure 3, therefore, if the jet nozzle is maintained too far above the bottom of the bore hole, valve 15 will partially block nozzle 2 so as to increase the hydraulic pressure in the drill string 1. Alternatively, if the jet nozzle assembly is permitted to drop undesirably close to the bottom of the bore hole, the ports 12 will be exposed by movement of sleeve 10 so as to cause a drop in hydraulic pressure in the drill string. Utilizing the apparatus of Figure 3, therefore, hydraulic indications are provided at the surface of the earth to inform an operator when the position of the drill with respect to the bottom of the bore hole has exceeded tolerable limits of placement.

Referring now to Figure 4, a preferred application of the invention is diagrammatically illustrated permitting automatic control of the rate at which the drill pipe is lowered into the earth. The apparatus of Figure 4 is employed in combination with the apparatus illustrated in Figure 3. As described, the valve and nozzle arrangement of Figure 3 is operative to decrease the hydraulic pressure in the drill string when the nozzle arrangement is undesirably close to the bottom of the bore hole. Similarly the arrangement of Figure 3 causes a rise in the hydraulic pressure in the drill string when the nozzle arrangement is undesirably far from the bottom of the bore hole. Automatic utilization of these changes in hydraulic pressure to control lowering of the drill pipe into the bore hole is disclosed in Figure 4.

In Figure 4, a conventional winch arrangement 20 is illustrated which is used to control lowering of the drill pipe 21 into the bore hole at the surface of the earth. Thus, a cable 22 wound on winch 20 may extend over a sheave, supported from a suitable derrick, which is diagrammatically indicated as pulley 23. This cable is fixed to a conventional swivel 24 which in turn supports drill pipe 21. A flexible conduit connection 25 extends from a pump 26 to the swivel 24 in order to permit the pumping of drilling fluid downwardly through the drill string 21. As these portions of the apparatus illustrated in Figure 4 are conventional and not a part of this invention, no further description of these elements will be given. As described, the pump and winch arrangement is employed to pump drilling mud through the drill string while the drill string is lowered into the bore hole.

The winch 20 may have a drum member 27 which is concentric with the winch axle and which extends beyond the cable winding arrangement on the winch. A brake band 28 may and conventionally is fixed to this drum. Suitable lugs 29 and 30 may be fixed to the brake band 28 to control the application of braking pressure to the winch. In the apparatus illustrated, the hydraulic pressure in the drill string is employed to control the braking of winch 20 so as to automatically control the rate at which drill pipe 21 is lowered into the ground so as to match the drilling rate and maintain the nozzle at an optimum distance from the bottom of the bore hole.

A support assembly 32 is fixed to the brake lug 30 to support a cylinder head 33, as by means of the threaded studs 34 extending through appropriate lugs of cylinder head 33 and support member 32. A hydraulic conduit 35 tap extends from conduit 25 to provide fluid access to cylinder head 33. A piston 36 positioned in hydraulic cylinder 33 may be directly coupled to brake lug 29 by attachment to the piston rod 31.

A spring element 38 may be positioned as illustrated so as to normally urge piston 36 away from support member 32. The spring loading is thus effective to urge piston 36 to the right as illustrated in the drawing, tending to increase braking pressure applied to winch 20. This has the effect of normally slowing or stopping rotation of the winch so as to slow or stop lowering of drill pipe into the bore hole. However, hydraulic pressure existent in the drill string acts against the spring force to drive piston 36 to the left, as illustrated, so as to decrease the braking pressure and to increase the rate at which the drill string is lowered.

It is apparent that this apparatus serves to automatically control the rate of lowering of the drill string into the bore hole as required to maintain optimum positioning of the jet assembly of Figure 3. Thus, at a time when the drill string is lowered too slowly, the drilling rate will exceed the rate at which the nozzle assembly is lowered into the bore hole. Consequently, valve member 15 will drop downwardly toward nozzle 2, as shown in Figure 3, so as to increase hydraulic pressure in the drill string. This action through the apparatus of Figure 4 is effective to decrease braking pressure on the winch 20 so as to increase the rate at which the drill string is lowered. Conversely, corrective braking action occurs when the drill pipe is being lowered too rapidly, as an excessive rate of lowering will cause ports 12 to open, thus reducing the hydraulic pressure and applying the brake.

In order to precisely control the rate of lowering the drill string as desired, means are included in Figure 4 for adjustably controlling the tension of spring 38 and consequently for precisely controlling sensitivity of the system to changes in hydraulic pressure. As illustrated, this may readily be accomplished by changing the position of the nuts on the threaded studs 34 which is effective to change tension of spring 38. By this means desired variations in pumping pressures may be compensated for so as to secure the automatic lowering of the drill pipe at a proper rate.

It may be observed that sufficient vibration and movement of a mechanical feeler of a character described occurs so that drilling immediately below the feeler is not impeded. The feeler normally has a reasonable operational life since the feeler is so positioned that direct impact by high velocity pellets does not normally occur. However, in all embodiments of the invention, it is practical to retrieve the mechanical feeler employed so as to permit replacement thereof by use of a wire line fishing tool.

What is claimed is:

1. In a drilling apparatus suspended on a tubular support adapted to drill a bore hole by pellet impacts while said tubular support is displaced above the bottom of the bore hole the improvement which comprises: a rod extension mounted in free longitudinal sliding relation with said drilling apparatus and normally extending below said apparatus in contact with the bottom of the bore hole, at least one hydraulic port passing through said apparatus in fluid communication with said tubular support, and valve means fixed to said rod extension adapted to be moved by said rod extension to a plurality of positions on relative longitudinal movement of said rod extension and said drilling apparatus, said valve acting to present varying resistance to fluid flow through at least one of said ports in the plurality of positions in which it is placed, fluid flow being maintained to some degree through at least one of said ports in each of said plurality of positions of said valve.

2. The apparatus defined by claim 1 including at least two ports, said valve means comprising a sleeve element mounted in sliding telescopic relation with said tubular support adjacent a first of said ports, said sleeve element acting in one position to close said first port and in another position to maintain said first port open, said sleeve element having an axial bore whereby fluid communication between the bore of said tubular support and the second of said ports is maintained in each position of said sleeve.

3. The apparatus defined by claim 1 in which the said valve means comprises an enlargement of the rod extension adapted to partially but not completely block said port at one limit of longitudinal movement of the rod and drilling apparatus.

4. A drilling apparatus comprising in combination: a tubular support member extending into a bore hole, a nozzle fixed to the lower termination of the support member, at least one fluid port passing through said tubular support, a rod extension passing through said nozzle and extending below the nozzle in free sliding relationship thereto, a first valve member fixed to said rod adapted to partially block said nozzle, and a second valve member fixed to said rod adapted in one position to seal, and in a second position to expose, said port on relative movement of the said rod and the said nozzle and tubular member.

5. Apparatus for maintaining a jet nozzle drilling assembly suspended from a winch on a drill string at an optimum spaced distance from the bottom of a bore hole comprising a rod extension extending through and below the said jet nozzle assembly to bear on the bottom of the bore hole, said extension having valve means fixed thereto adapted to increase and decrease hydraulic pressure in the said drill string in accordance with displacement of the jet nozzle assembly from the bottom of the bore hole, and in combination therewith a brake applying a controlled braking effect to said winch, pressure actuated control means operative to increase and decrease the braking effect of said brake and means applying the hydraulic pressure within said drill string to said control means whereby variations in hydraulic pressure within said drill string will effect variations in the rate of lowering of said drill string by said winch.

6. In a jet nozzle drilling assembly adapted for arrangement in a bore hole, said assembly including a nozzle opening, a device to effect changes in hydraulic pressure within the assembly indicative of the distance of said nozzle assembly from the bottom of the bore hole comprising an extension member movably held by and extending beneath said jet nozzle assembly and valve means fixed to said extension member adapted to change the resistance to fluid flow out of said nozzle assembly into the bore hole at a selected vertical position of said extension member relative to said nozzle assembly, said valve means being so arranged with respect to said nozzle opening that said nozzle opening is not completely closed off in any position of said valve.

7. Apparatus for drilling a bore hole in the earth comprising in combination: a tubular support member extending into a bore hole, a jet nozzle assembly fixed to the lower termination of the said support member in fluid communication therewith including at least one nozzle opening, a mechanical standoff member adapted to bear on the bottom of the bore hole in sliding relationship with the said nozzle assembly, and valve means fixed to said standoff member operative to change the resistance to fluid flow out of said support member into the bore hole responsive to a change in the vertical position of said standoff relative to said nozzle assembly, said valve means being so arranged with respect to said nozzle opening that said nozzle opening is not completely closed off in any position of said valve.

8. Apparatus for drilling a bore hole in the earth comprising in combination: a tubular support member extending into a bore hole, a jet nozzle assembly fixed to the lower termination of the said support member in fluid communication therewith including at least one nozzle opening and at least one fluid port opening from the interior of said jet nozzle assembly to the bore hole, a mechanical standoff member movably held by and extending below said jet nozzle assembly in a manner adapting said standoff member to bear on the bottom of the bore hole, and valve means attached to said standoff member and movable by said standoff member to a first position partially but not completely blocking said nozzle opening and to a second position opening a fluid passage through said fluid port.

References Cited in the file of this patent

UNITED STATES PATENTS

| | | |
|---|---|---|
| 1,659,826 | Malloy et al. | Feb. 21, 1928 |
| 2,117,078 | Brauer | May 10, 1938 |